United States Patent
Sato et al.

(10) Patent No.: US 7,257,240 B2
(45) Date of Patent: Aug. 14, 2007

(54) INPUT DEVICE, INFORMATION DEVICE, AND CONTROL INFORMATION GENERATION METHOD

(75) Inventors: Daisuke Sato, Chino (JP); Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 10/654,443

(22) Filed: Sep. 4, 2003

(65) Prior Publication Data

US 2004/0101174 A1    May 27, 2004

(30) Foreign Application Priority Data

Sep. 24, 2002    (JP)    ............... 2002-277456

(51) Int. Cl.
*G06K 9/00* (2006.01)
*H04K 1/00* (2006.01)
(52) U.S. Cl. .............................. 382/124; 713/186
(58) Field of Classification Search ................ 382/103, 382/124, 209, 218, 286, 289, 291, 296; 713/186
See application file for complete search history.

(56) References Cited

U.S. PATENT DOCUMENTS

| | | | |
|---|---|---|---|
| 5,537,484 A * | 7/1996 | Kobayashi | ................ 382/124 |
| 5,808,605 A | 9/1998 | Shieh | |
| 5,960,101 A * | 9/1999 | Lo et al. | ...................... 382/125 |
| 6,175,640 B1 * | 1/2001 | Wada | ......................... 382/124 |
| 6,201,886 B1 * | 3/2001 | Nakayama | ................... 382/124 |
| 6,757,410 B1 * | 6/2004 | Nakashima | ................. 382/124 |
| 6,898,301 B2 * | 5/2005 | Iwanaga | ..................... 382/124 |

FOREIGN PATENT DOCUMENTS

| | | |
|---|---|---|
| JP | A 5-40571 | 2/1993 |
| JP | A-10-063426 | 3/1998 |
| JP | A-2001-265523 | 9/2001 |

OTHER PUBLICATIONS

U.S. Appl. No. 10/654,423, filed Sep. 4, 2003, Sato et al.
U.S. Appl. No. 10/653,170, filed Sep. 3, 2003, Miyasaka et al.
U.S. Appl. No. 10/655,418, filed Sep. 22, 2003, Sato.

* cited by examiner

*Primary Examiner*—Daniel Mariam
(74) *Attorney, Agent, or Firm*—Oliff & Berridge, PLC

(57) ABSTRACT

An input device, which generates control information by capturing an image of a detection object, comprises: a registered image storage section which stores a registered image in which a parameter value is associated with at least a part of the registered image; an image capture section which captures an image of the detection object; and a control information output section which outputs control information corresponding to the parameter value associated with an area of the registered image corresponding to the image of the detection object.

13 Claims, 19 Drawing Sheets

FIG. 12A ORIGINAL POSITION
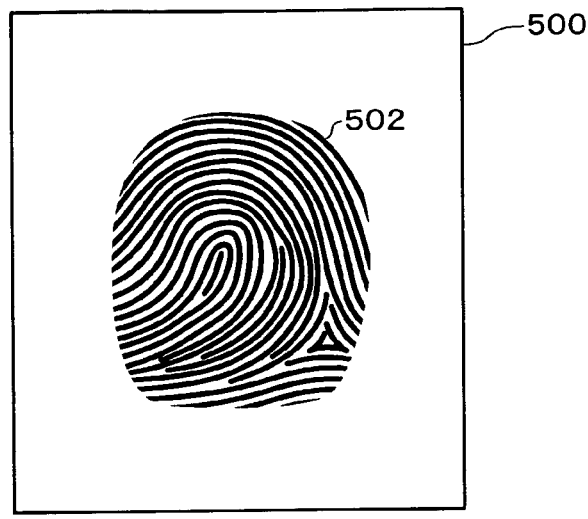
FIG. 12B LEFT SIDE OF FINGER
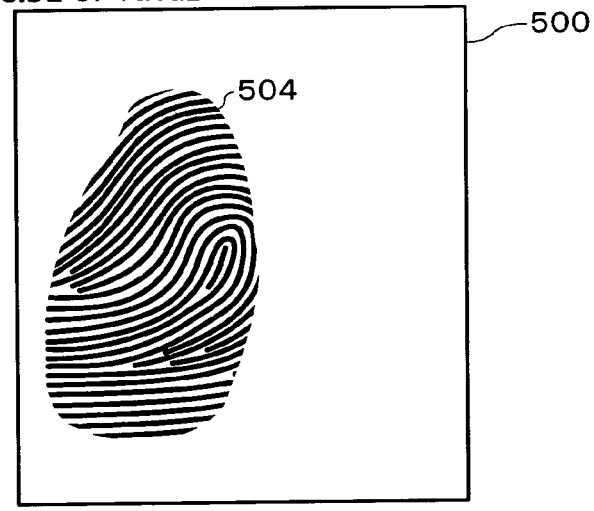
FIG. 12C RIGHT SIDE OF FINGER
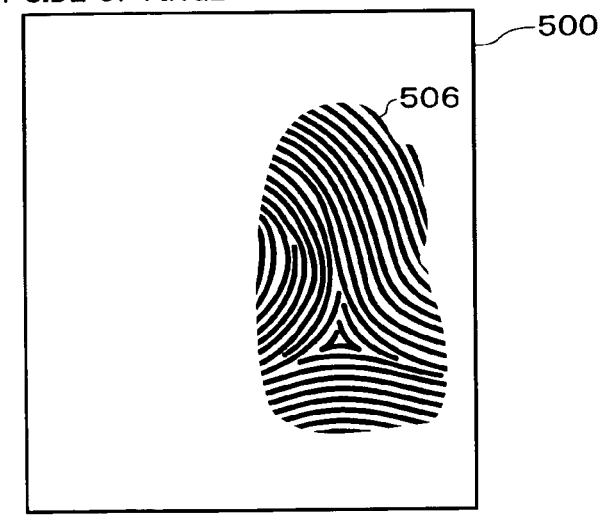

FIG. 13A  JOINT SIDE OF FINGER
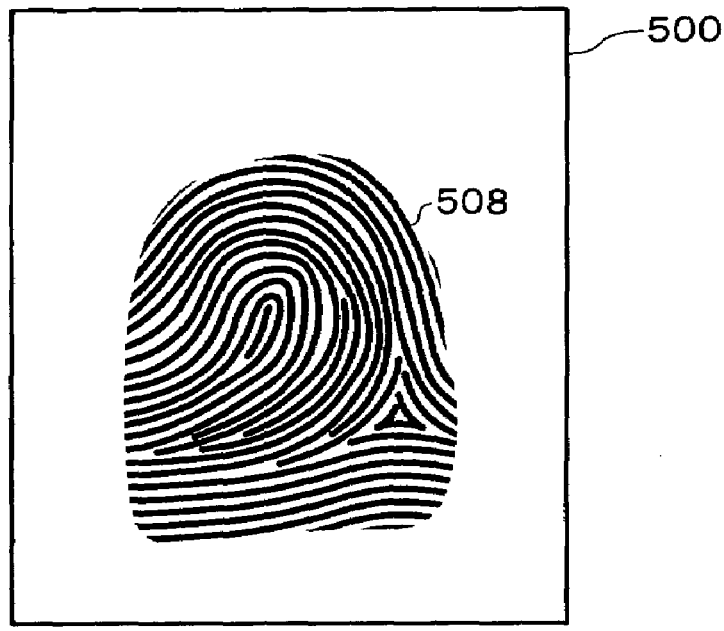
FIG. 13B  TIP SIDE OF FINGER
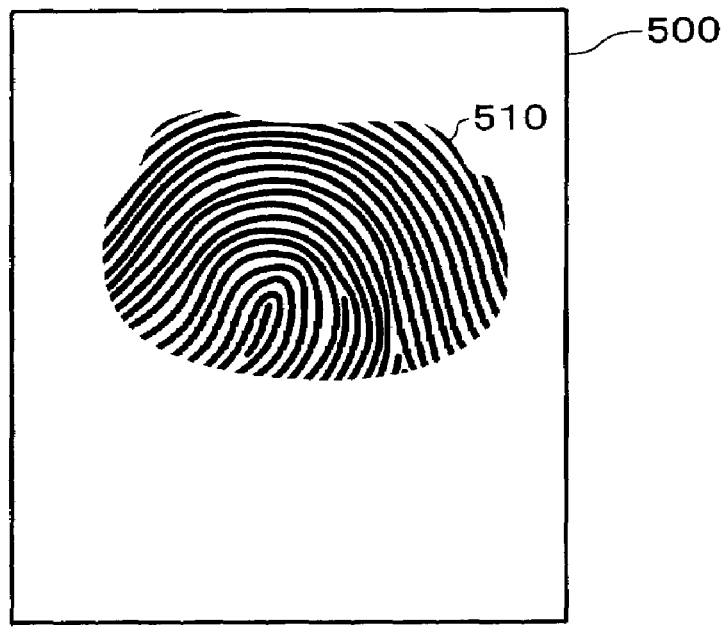

INPUT DEVICE, INFORMATION DEVICE, AND CONTROL INFORMATION GENERATION METHOD

Japanese Patent Application No. 2002-277456 filed on Sep. 24, 2002, is hereby incorporated by reference in its entirety.

BACKGROUND OF THE INVENTION

The present invention relates to an input device, an information device including the same, and a control information generation method.

An input device is used as an operating section of an electronic instrument (information instrument or information device). For example, if the user operates the input device, a pointer displayed in a display section is moved or an image of the display section is scrolled in the electronic instrument by using control information (operation information) output from the input device. It is necessary that the input device not decrease operability of the user.

BRIEF SUMMARY OF THE INVENTION

One aspect of the present invention relates to an input device which generates control information by capturing an image of a detection object, comprising:

a registered image storage section which stores a registered image in which a parameter value is associated with at least a part of the registered image;

an image capture section which captures an image of the detection object; and a control information output section which outputs control information corresponding to the parameter value associated with an area of the registered image corresponding to the image of the detection object.

Another aspect of the present invention relates to an information device comprising:

the above input device; and a processing section which performs control processing based on the control information from the input device.

A further aspect of the present invention relates to a control information generation method for generating control information by using a captured image of a detection object, the control information generation method comprising:

comparing a captured image of the detection object with a registered image in which a parameter value is associated with at least a part of the registered image; and outputting control information corresponding to the parameter value associated with an area of the registered image corresponding to the image of the detection object.

BRIEF DESCRIPTION OF THE SEVERAL VIEWS OF THE DRAWING

FIGS. 12A, 12B, and 12C illustrate examples of fingerprint images of each region of a finger.

FIGS. 13A and 13B illustrate other examples of fingerprint images of each region of a finger.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements to the present invention.

An input device provided with improved operability when indicating an arbitrary position in a three-dimensional space has been proposed. In this input device, a reference point is set. In the case where the indicated position is not displayed on the screen, the viewpoint is moved by combination of movement around the reference point and movement along a straight line which connects the reference point with the viewpoint, and the three-dimensional space is regenerated (displayed) from the viewpoint after the movement. In the case where the indicated position appears on the screen, a cursor is moved on the screen (Japanese Patent Application Laid-open No. 5-40571, for example). The above operation makes it unnecessary to perform the operation in the six-axis directions in this input device.

However, it is difficult to apply the input device disclosed in Japanese Patent Application Laid-open No. 5-40571 to a portable information instrument. In the case of applying an input device to a portable information instrument, the input device must have a configuration which allows operation by use of a battery and reduction of the size. It is desirable that the input device having the above-described function be applied not only to a three-dimensional CAD device or a virtual reality experience device which performs advanced information processing, but also to a portable telephone or a PDA.

According to the following embodiments, an input device which is extremely small and lightweight and is capable of further improving operability, an information device, and a control information generation method can be provided.

The embodiments of the present invention are described below in detail with reference to the drawings.

1. Input Device

Figure 1:
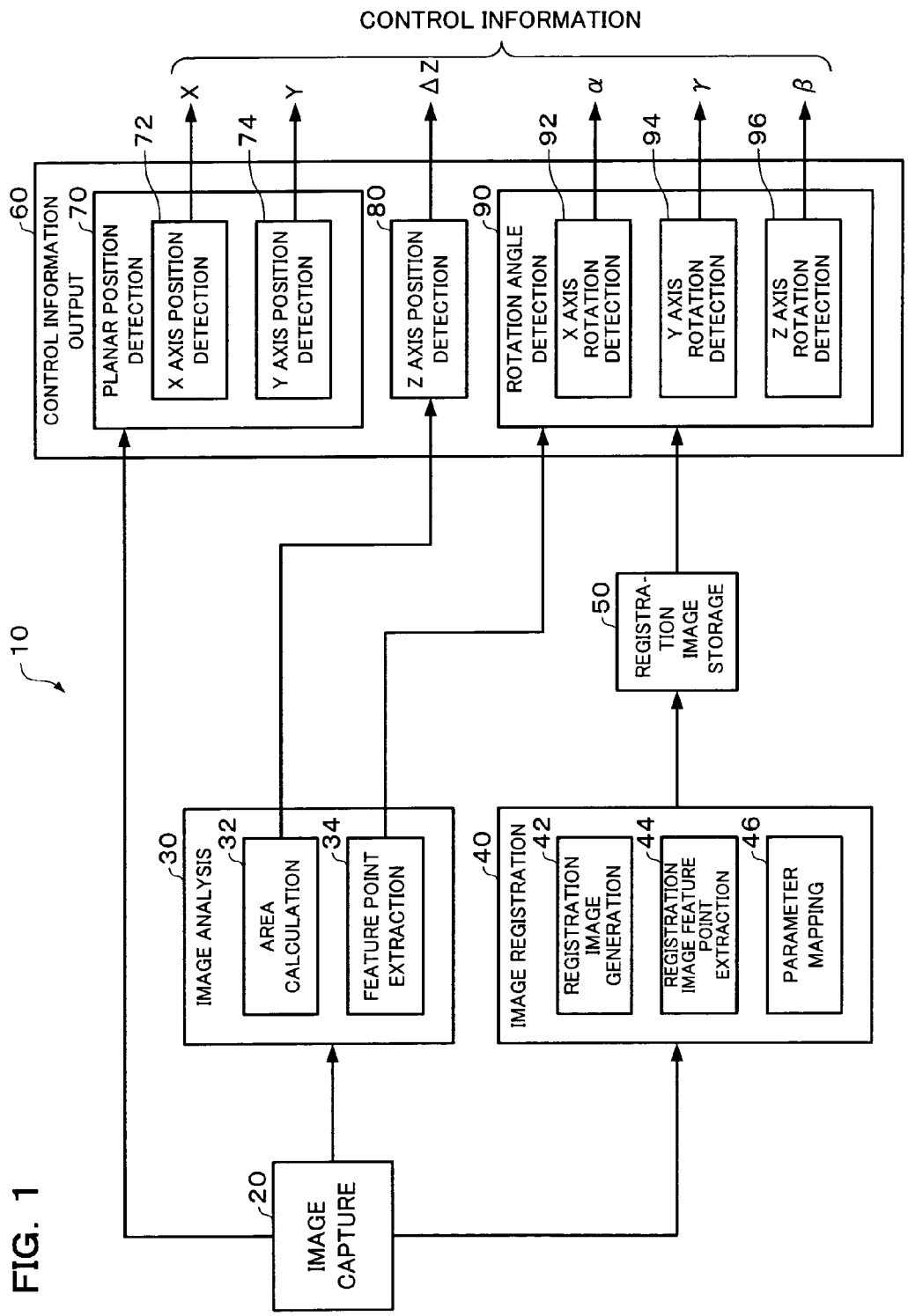
FIG. 1 is a configurational block diagram of an input device in an embodiment of the present invention.

FIG. 1 shows an outline of a configuration of an input device in this embodiment. An input device 10 in this embodiment is capable of comparing a registered image with a captured image, and outputting control information (operation information) in the six-axis directions based on the comparison result. Therefore, the input device 10 includes an image capture section 20, an image analysis section 30, an image registration section 40, a registered image storage section 50, and a control information output section 60.

The image capture section 20 captures a two-dimensional or three-dimensional detection object which is moved by the user as an image (two-dimensional information) through a detection surface (sensor surface), and generates image information in each frame.

The image analysis section 30 analyzes the image captured by the image capture section 20, and outputs the analysis result to the control information output section 60. In more detail, the image analysis section 30 includes an area calculation section 32 and a feature point extraction section 34. The area calculation section 32 calculates the area of the image of the detection object captured by the image capture section 20 or a value equivalent to the area. The feature point extraction section 34 extracts a feature point of the image captured by the image capture section 20. The feature point used herein refers to a position (region) characteristic of the image which can be referred to for specifying the moving distance, moving direction, or rotation angle between two images before and after movement by comparing the two images.

The image registration section 40 performs processing for registering the registered image. In more detail, the image registration section 40 connects images of each region of the detection object captured by the image capture section 20 to generate one image. The image registration section 40 associates each section (representative point of each section, for example) of the images with values of parameters associated with the regions of the detection object corresponding to each section, and registers the image as the registered image. The images of each region of the detection object captured by the image capture section 20 may be images of the detection object viewed from each direction. This enables the image of the surface of the detection object having a three-dimensional shape to be registered as the registered image. In this case, the values of the parameters associated with the regions of the detection object may be values corresponding to the viewing directions of the detection object. In this embodiment, the image registration section 40 includes a registered image generation section 42, a registered image feature point extraction section 44, and a parameter mapping section 46. The registered image generation section 42 connects one or more images of each region of the detection object captured by the image capture section 20 to generate one sheet of image. As a result, one sheet of two-dimensional image which shows the surface of the detection object having a three-dimensional shape is obtained. The registered image feature point extraction section 44 extracts feature points of one sheet of image generated by the registered image generation section 42. In this embodiment, reduction of the processing and the amount of data is achieved by comparing (collating) the images by using the feature points of the images (or distributions of the feature points). The parameter mapping section 46 maps (associates) the values of the parameters on each feature point of the image extracted by the registered image feature point extraction section 44.

The registered image storage section 50 stores the registered image which is generated by the image registration section 40 and on which the values of the parameters are mapped.

The control information output section 60 outputs control information by using the image captured by the image capture section 20 or the registered image stored in the registered image storage section 50. The control information is control information in the six-axis directions as described above.

Figure 2:
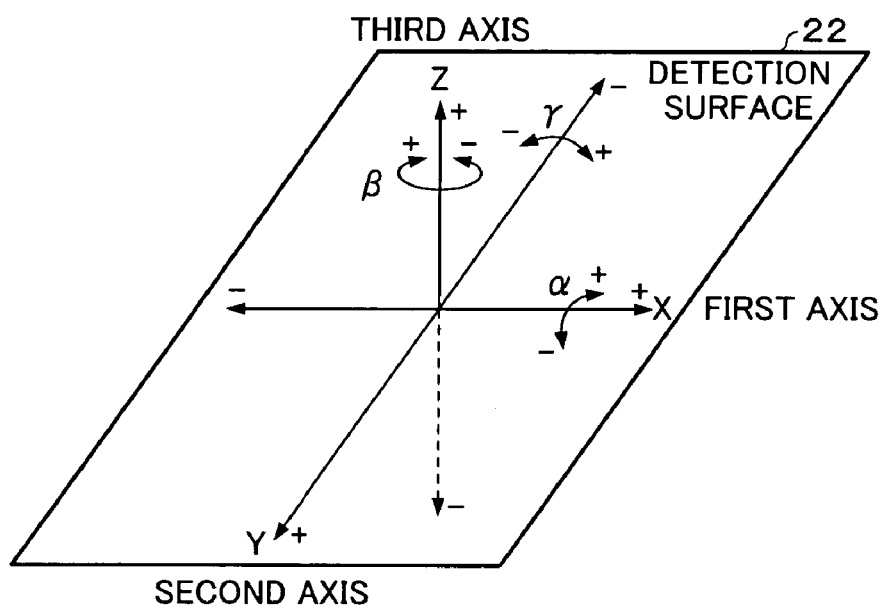
FIG. 2 is illustrative of control information in six-axis directions.

FIG. 2 is illustrative of the control information in the six-axis directions. The control information in the six-axis directions is information indicated for the six-axis directions including positions X and Y in the X axis and Y axis (first axis and second axis) directions which intersect at right angles on a detection surface (sensor surface) 22 of the image capture section 20 (or on a plane parallel to the detection surface), a position Z in the Z axis (third axis) direction perpendicular to the detection surface, a rotation angle $\alpha$ around the X axis, a rotation angle $\gamma$ around the Y axis, and a rotation angle $\beta$ around the Z axis. As shown in FIG. 2, a (+) direction and a (−) direction are specified for each of the position X in the X axis direction, the position Y in the Y axis direction, the position Z in the Z axis direction, the rotation angle $\alpha$ around the X axis, the rotation angle $\beta$ around the Z axis, and the rotation angle $\gamma$ around the Y axis.

In this embodiment, in order to calculate the rotation angles around each axis in addition to the movement in the X axis direction and the Y axis direction specified on the detection surface and the Z axis direction while reducing the processing load, the registered image, the image of the detection object, and the area or feature point of the image are used. Therefore, the control information output section 60 shown in FIG. 1 includes a planar position detection section 70, a Z axis position detection section 80, and a rotation angle detection section 90.

The planar position detection section 70 includes an X axis position detection section 72 which detects the position on the detection surface in the X axis direction, and a Y axis position detection section 74 which detects the position on the detection surface in the Y axis direction. The X axis position detection section 72 and the Y axis position detection section 74 detect the positions in the X axis direction and the Y axis direction based on the coordinates on the detection surface on which the image of the detection object is located, and output the control information corresponding to the detected positions in the X axis direction and the Y axis direction.

The Z axis position detection section 80 detects the position in the Z axis direction perpendicular to the detection surface. In more detail, the Z axis position detection section 80 detects the position in the Z axis direction by using the area of the image of the detection object calculated by the area calculation section 32, and outputs the control information corresponding to the detected position in the Z axis direction. The Z axis position detection section 80 may calculate the position in the Z axis direction based on the ratio of the area of the image of the detection object calculated by the area calculation section 32 with respect to the area of the registered image stored in the registered image storage section 50, for example. The Z axis position detection section 80 may calculate the position in the Z axis direction based on the ratio of the area of the image of the detection object with respect to the maximum area which can be captured on the detection surface 22, for example.

The rotation angle detection section 90 calculates the rotation angles of the detection object around the X axis, the Y axis, and the Z axis. Therefore, the rotation angle detection section 90 includes an X axis rotation detection section 92, a Y axis rotation detection section 94, and a Z axis rotation detection section 96. The X axis rotation detection section 92 calculates the area of the registered image stored in the registered image storage section 50 in which the image of the detection object is located by using the feature points of the image of the detection object calculated by the feature point extraction section 34. The X axis rotation detection section 92 outputs the rotation angle α around the X axis corresponding to the parameter value associated with the corresponding area of the registered image as the control information. The Y axis rotation detection section 94 outputs the rotation angle γ around the Y axis corresponding to the parameter value associated with the corresponding area of the registered image as the control information in the same manner as the X axis rotation detection section 92. The Z axis rotation detection section 96 outputs the rotation angle β around the Z axis corresponding to the parameter value associated with the corresponding area of the registered image as the control information in the same manner as the X axis rotation detection section 92 and the Y axis rotation detection section 94.

In this embodiment, the position in the X axis direction, the Y axis direction, or the Z axis direction can be calculated even in the case where the detection object is rotated while being slid on the detection surface. Therefore, the X axis position detection section 72 corrects the calculated position in the X axis direction taking rotation of the detection object around the Y axis into consideration, and outputs the corrected position X in the X axis direction as the control information. In more detail, provided that the position of the detection object on the detection surface is $X_{sensor}$ and the rotation angle (second rotation angle) around the Y axis (second axis) is γ, the X axis position detection section 72 calculates the position X of the detection object on the detection surface in the X axis (first axis) direction as expressed by the following equation (1).

$$X = X_{sensor} - a \cdot \gamma \text{ (where } 0 \leq a \leq 1\text{)} \quad (1)$$

The coefficient a (given first coefficient) is a weighting coefficient of the rotation angle γ around the Y axis. If the weighting coefficient a is 0, the rotation angle around the Y axis is not taken into consideration. Therefore, this applies to the output X in the case where the detection object is moved on the detection surface without being rotated. This also applies to the case where the detection object is rotated without being slid on the detection surface so that the rotation angle γ is output and the output X is not changed. If the weighting coefficient a is 1, this applies to the case where the detection object is merely rotated while being slid on the detection surface and is not moved. It is preferable that the weighting coefficient a be determined by adding the user's peculiar operation in the X axis direction, for example.

The Y axis position detection section 74 corrects the calculated position in the Y axis direction taking rotation of the detection object around the X axis into consideration, and outputs the corrected position Y in the Y axis direction as the control information. In more detail, provided that the position of the detection object on the detection surface is $Y_{sensor}$ and the rotation angle (first rotation angle) around the X axis (first axis) is α, the Y axis position detection section 74 calculates the position Y of the detection object on the detection surface in the Y axis direction as expressed by the following equation (2).

$$Y = Y_{sensor} - b \cdot \alpha \text{ (where } 0 \leq b \leq 1\text{)} \quad (2)$$

The coefficient b (given second coefficient) is a weighting coefficient of the rotation angle α around the X axis. If the weighting coefficient b is 0, the rotation angle around the X axis is not taken into consideration. Therefore, this applies to the output Y in the case where the detection object is moved on the detection surface without being rotated. This also applies to the case where the detection object is rotated without being slid on the detection surface so that the rotation angle α is output and the output Y is not changed. If the weighting coefficient b is 1, this applies to the case where the detection object is merely rotated while being slid on the detection surface and is not moved. It is preferable that the weighting coefficient b be determined by adding the user's peculiar operation in the Y axis direction, for example.

The Z axis position detection section 80 corrects the calculated position in the Z axis direction taking rotation of the detection object around the X axis and the Y axis into consideration, and outputs the corrected position Z in the Z axis direction as the control information. In more detail, provided that the position of the detection object on the detection surface in the Z axis direction is $Z_{sensor}$, the Z axis position detection section 80 calculates the position Z of the detection object on the detection surface in the Z axis direction as expressed by the following equation (3).

$$Z = Z_{sensor} + f(\gamma) + g(\alpha) \quad (3)$$

The function f(γ) is a function having the rotation angle γ as a variable. It is preferable that the function f(γ) be a function symmetrical with respect to the absolute value of the variable γ with respect to the origin. As the function f(γ), a quadratic function which passes through the origin may be employed. The function g(α) is a function having the rotation angle α as a variable. An arbitrary function which passes through the origin may be employed as the function g(α). The function values of the functions f(γ) and g(α) may be calculated each time the rotation angles γ and α are calculated. A table of the function values corresponding to the variables γ and α may be created in advance, and the table may be referred to each time the rotation angles γ and α are calculated. A correction value may be mapped on the registered image in advance since the position Z varies depending on the shape and softness of the finger. According to the equation (3), since the area in which the finger is in contact with the detection surface is changed when the finger is inclined, even if the finger is pressed against the detection surface at an equal pressure, information in which the change in the area is mistaken as Z can be prevented from being output by correcting the position Z as in the above equation.

The position Z of the detection object on the detection surface in the Z axis direction may be calculated so that the position Z is linearly changed with respect to the rotation angles γ and α as shown by the following equation (3)'.

$$Z = Z_{sensor} - c \cdot \gamma - d \cdot \alpha \text{ (where } 0 \leq c \text{ and } d \leq 1\text{)} \quad (3)'$$

The coefficient c (given third coefficient) is a weighting coefficient of the rotation angle γ around the Y axis. The coefficient d (given fourth coefficient) is a weighting coefficient of the rotation angle α around the X axis. If the weighting coefficient c (d) is 0, the rotation angle around the Y (X) axis is not taken into consideration. Therefore, this applies to the output Z in the case where the detection object is moved on the detection surface without being rotated. This also applies to the case where the detection object is rotated without being slid on the detection surface so that the rotation angles γ and α are output and the output Z is not changed. If the weighting coefficient c (d) is 1, this applies to the case where the detection object is merely rotated while being slid on the detection surface and is not moved. It is preferable that the weighting coefficients c and d be determined by adding influence of the user's peculiar operations in the X axis direction and the Y axis direction on the movement in the Z axis direction, for example.

The input device is described below in detail. The input device described below uses a fingerprint sensor. However, the present invention is not limited thereto.

Figure 3:
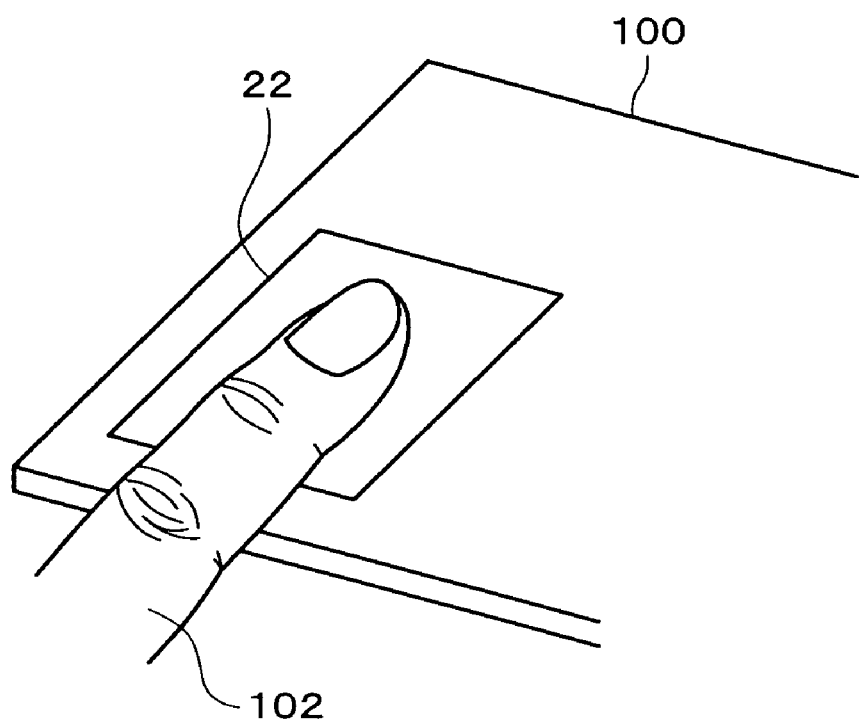
FIG. 3 is an external configuration diagram showing an outline of an input device using a fingerprint sensor.

FIG. 3 shows an outline of an external configuration of the input device using a fingerprint sensor. FIG. 3 shows the case where the input device in this embodiment is mounted on an IC card (information device in a broad sense) 100. The IC card 100 includes a CPU and a memory device. This enables the IC card 100 to be provided with improved security protection and to store a large amount of advanced information by information processing. Information processing to which various types of operation of the user are reflected can be performed by using an extremely small and lightweight configuration by using the input device in this embodiment.

In FIG. 3, a fingerprint image is captured by allowing a finger (detection object in a broad sense) 102 of the user on which a fingerprint pattern is formed to come in contact with the detection surface 22 of the fingerprint sensor as the input device. The control information corresponding to movement of the finger 102 by the user in the six-axis directions which is detected in the three-dimensional space specified on the detection surface 22 is output. Processing based on the control information is performed in the IC card 100. In the case where a liquid crystal panel is provided to the IC card 100, display control such as movement of a pointer displayed on the liquid crystal panel or scrolling of the display image is performed. In the case where the input device is applied to a three-dimensional CAD device, rotation of the object of operation or movement of the viewpoint is controlled.

Figure 4:
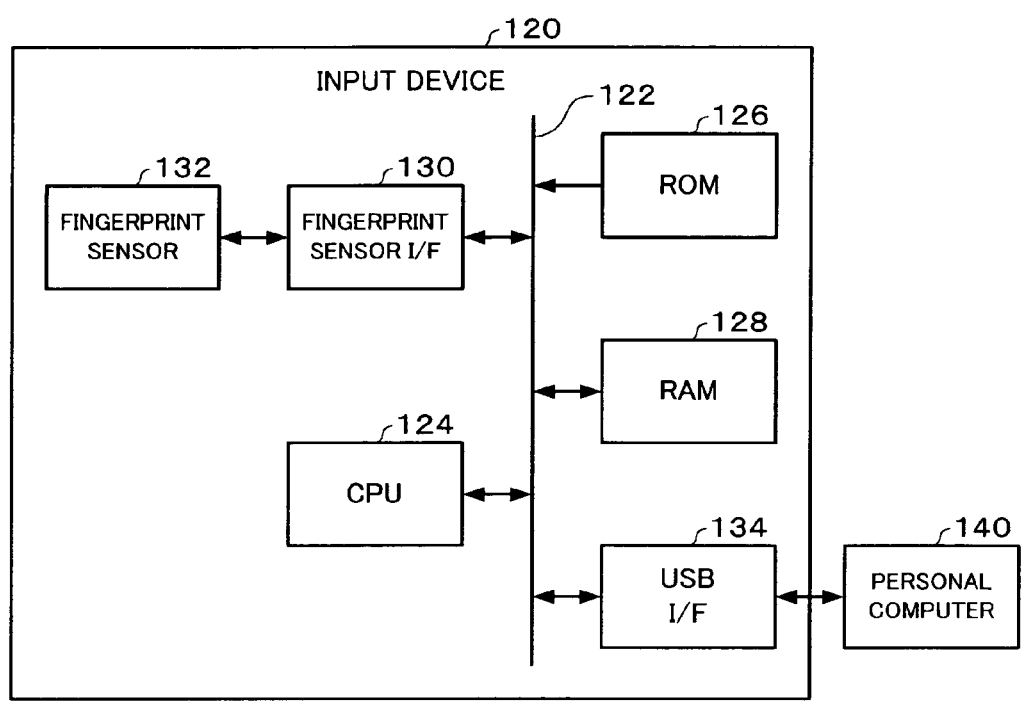
FIG. 4 is a block diagram showing a hardware configuration example of an input device.

FIG. 4 shows a hardware configuration example of the input device. In an input device 120, a CPU 124, a ROM 126, a RAM 128, and a fingerprint sensor interface (I/F) circuit 130 are connected with a bus 122. A fingerprint sensor 132 is connected with the fingerprint sensor I/F circuit 130. A USB I/F circuit 134 is connected with the bus 122. The USB I/F circuit 134 is connected with a host device or a peripheral device defined in the USB standard such as a personal computer 140 outside the input device.

The function of the image capture section 20 shown in FIG. 1 is mainly realized by the fingerprint sensor 132 and the fingerprint sensor I/F circuit 130. A fingerprint image captured by the fingerprint sensor 132 is stored in the RAM 128 through the fingerprint sensor I/F circuit 130. The functions of the image analysis section 30, the image registration section 40, and the control information output section 60 shown in FIG. 1 are realized by the CPU 124 and a software program stored in the ROM 126 or RAM 128. The function of the registered image storage section 50 shown in FIG. 1 is realized by the RAM 128.

1.1 Fingerprint Sensor

Figure 5:
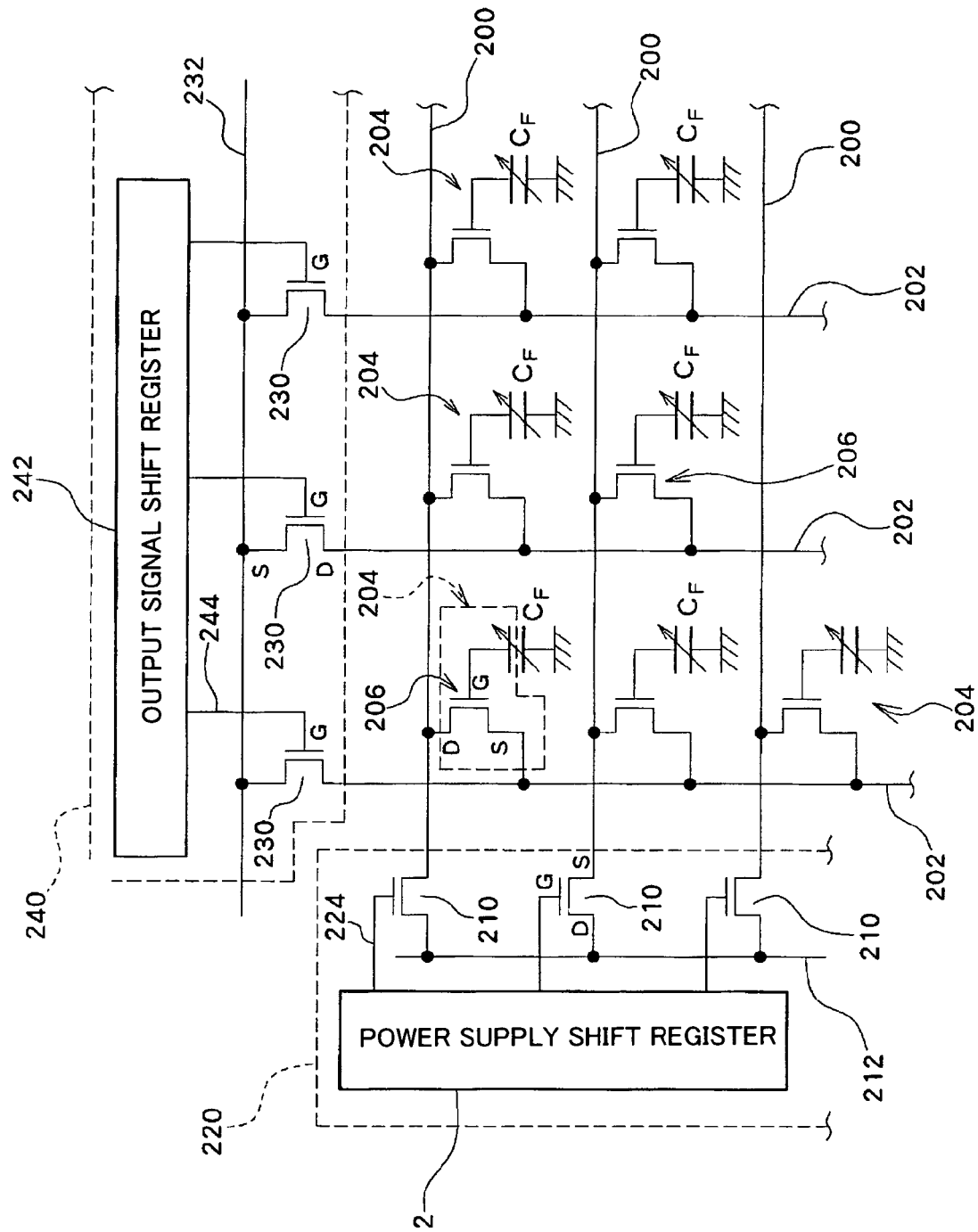
FIG. 5 is a circuit configuration diagram showing an example of a fingerprint sensor.

FIG. 5 shows an example of the fingerprint sensor 132. In FIG. 5, the fingerprint sensor 132 includes M (M is an integer of two or more) power supply lines 200 and N (N is an integer of two or more) output lines 202. A capacitance detection element 204 is provided at each intersecting point of the M power supply lines 200 and the N output lines 202. The capacitance detection element 204 shown in FIG. 5 is illustrated as a closed circuit when a finger is in contact with the capacitance detection element 204. The capacitance detection element 204 includes a variable capacitor $C_F$ of which the capacitance is changed depending on a ridge/valley pattern of a finger, and a signal amplification element such as a signal amplification MIS thin film semiconductor device (hereinafter abbreviated as "signal amplification TFT") 206. If a finger is not in contact with the capacitance detection element 204, a grounding terminal of the variable capacitor $C_F$ is in an open state. The variable capacitor $C_F$ is described later.

The M power supply lines 200 are connected with drains D of the N signal amplification TFTs 206 arranged along the corresponding row. The M power supply lines 200 are connected with a common power supply line 212 through M power supply pass gates 210. Specifically, the power supply pass gate 210 is formed by using a MIS thin film semiconductor device. A source S of the power supply pass gate 210 is connected with the power supply line 200, and a drain D of the power supply pass gate 210 is connected with the common power supply line 212. A power supply shift register 222 is provided to a power supply select circuit 220 in addition to the M power supply pass gates 210 and the common power supply line 212. A gate G of each of the M power supply pass gates 210 is connected with a power supply select output line 224 of the power supply shift register 222.

The N output lines 202 are connected with sources S of the N signal amplification TFTs 206 arranged along the corresponding column. The N output lines 202 are connected with a common output line 232 through N output signal pass gates 230. Specifically, the output signal pass gate 230 is formed by using an MIS thin film semiconductor device. A drain D of the output signal pass gate 230 is connected with the output line 202, and a source S of the output signal pass gate 230 is connected with the common output line 232. An output signal shift register 242 is provided to an output signal select circuit 240 in addition to the N output signal pass gates 230 and the common output line 232. A gate G of the output signal pass gate 230 is connected with an output select output line 244 of the output signal shift register 242.

Figure 6:
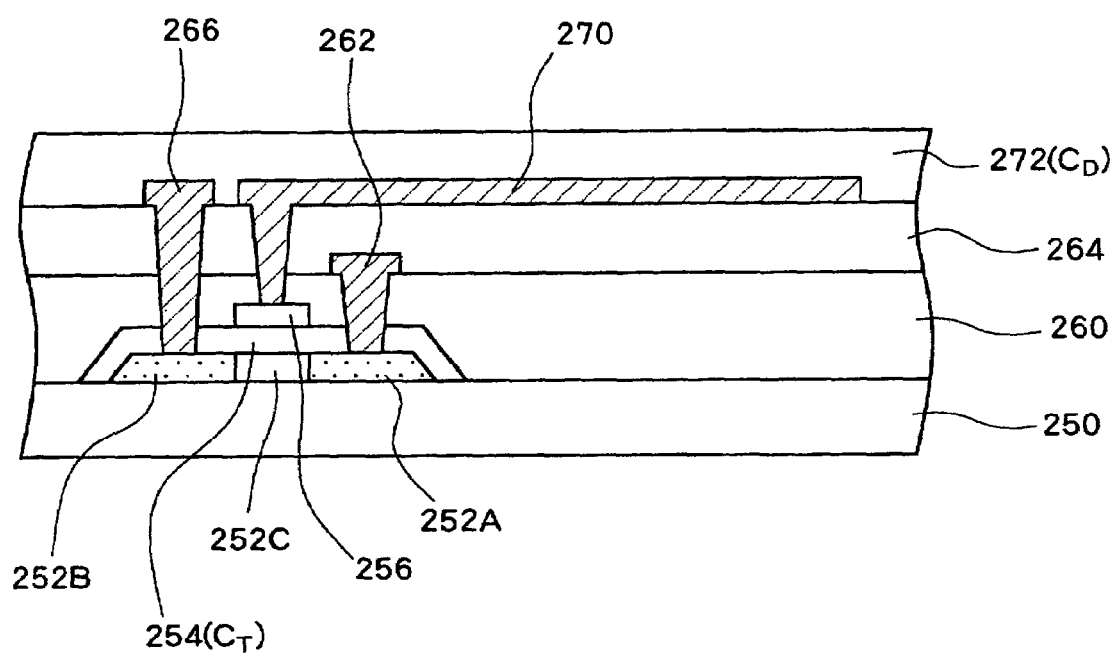
FIG. 6 is a cross-sectional view showing a capacitance detection element.

FIG. 6 is a cross-sectional view showing the capacitance detection element 204 shown in FIG. 5. FIG. 6 shows a state in which a finger is not in contact with the capacitance detection element 204. The capacitance detection element 204 includes a signal detection element 208 in addition to the signal amplification TFT 206 which is the signal amplification element.

In FIG. 6, a semiconductor film 252 including a source region 252A, a drain region 252B, and a channel region 252C present between the source region 252A and the drain region 252B is formed on an insulating layer 250. A gate insulating film 254 is formed on the semiconductor film 252. A gate electrode 256 is formed in a region which faces the channel region 252C with the gate insulating film 254 interposed therebetween. The semiconductor film 252, the gate insulating film 254, and the gate electrode 256 make up the signal amplification TFT 206. The power supply pass gate 210 and the output signal pass gate 230 are formed in the same manner as the signal amplification TFT 206.

The signal amplification TFT 206 is covered with a first interlayer dielectric 260. A first interconnect layer 262 corresponding to the output line 202 shown in FIG. 5 is formed on the first interlayer dielectric 260. The first interconnect layer 262 is connected with the source region 252A of the signal amplification TFT 206.

The first interconnect layer 262 is covered with a second interlayer dielectric 264. A second interconnect layer 266 corresponding to the power supply line 200 shown in FIG. 5 is formed on the second interlayer dielectric 264. The second interconnect layer 266 is connected with the drain region 252B of the signal amplification TFT 206. As another structure differing from the structure shown in FIG. 6, the second interconnect layer 266 may be formed on the first interlayer dielectric 260, and the first interconnect layer 262 may be formed on the second interlayer dielectric 264.

A capacitance detection electrode 270 is formed on the second interlayer dielectric 264. A capacitance detection dielectric film 272 is formed to cover the capacitance detection electrode 270. The capacitance detection dielectric film 272 is located on the outermost surface of the fingerprint sensor 132 and functions as a protective film. A finger comes in contact with the capacitance detection dielectric film 272. The signal detection element 208 is made up of the capacitance detection electrode 270 and the capacitance detection dielectric film 272.

1.1.1 Fingerprint Detection Operation

A fingerprint is detected by allowing a finger to come in contact with the capacitance detection dielectric film 272 shown in FIG. 6. A start switch (pressure-sensitive switch, for example) 42 of the fingerprint sensor 132 is operated to allow a power supply inside the input device 120 to be operated, whereby power is automatically supplied to the fingerprint sensor 132. The input device 120 may be provided to the personal computer 140, and power may be supplied from a power supply section of the personal computer 140.

In this embodiment, a signal is sequentially removed from the M×N capacitance detection elements 204 by providing a power supply voltage to one of the M power supply lines 200 shown in FIG. 5 and detecting a signal from one of the N output lines 202.

The fingerprint detection operation is roughly divided into (1) a case where a ridge (projecting section) of the fingerprint pattern comes in contact with the capacitance detection dielectric film 272, and (2) a case where a valley (recess section) of the fingerprint pattern faces the capacitance detection dielectric film 272.

(1) When Ridge (Projecting Section) of Fingerprint Pattern Comes in Contact with Capacitance Detection Dielectric Film 272

Figure 7:
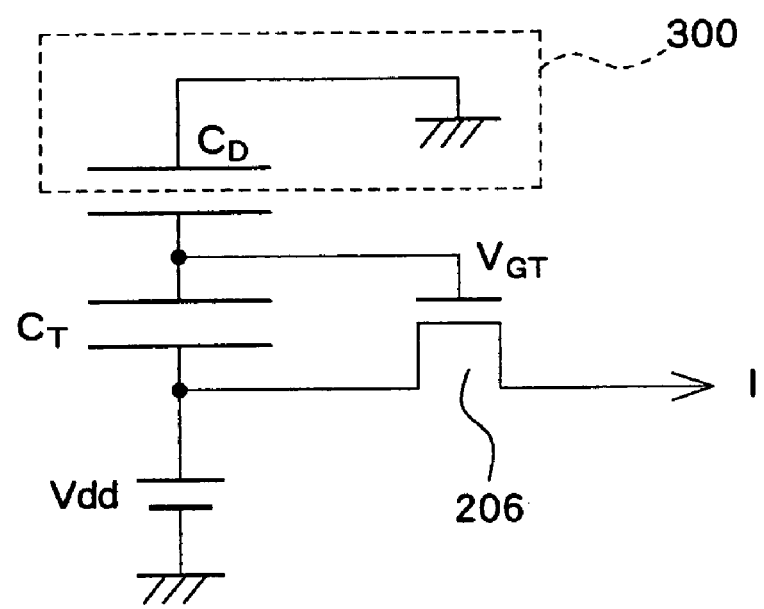
FIG. 7 is an equivalent circuit diagram of a capacitance detection element in the case where a ridge of a finger is in contact with a capacitance detection dielectric film.

FIG. 7 shows an equivalent circuit of the capacitance detection element 204 in this case. A symbol 300 corresponds to a ridge of a human fingerprint. A grounding electrode 300 which faces the capacitance detection electrode 270 shown in FIG. 6 with the dielectric film 272 interposed therebetween is formed in a region indicated by the symbol 300. A power supply voltage Vdd is supplied from the common power supply line 212. A symbol $C_T$ indicates a transistor capacitor of the signal amplification TFT 206. A symbol $C_D$ indicates a capacitor between the detection electrode 270 and the grounding electrode (finger) 300.

The length of the gate electrode of the signal amplification TFT 206 is referred to as L (μm), the width of the gate electrode is referred to as W (μm), the thickness of the gate insulating film is referred to as tox (μm), the relative dielectric constant of the gate insulating film is referred to as $\in$ox, and the dielectric constant under vacuum is referred to as $\in$o. The capacitance of the transistor capacitor $C_T$ is expressed by the following equation (4).

$$C_T = \in o \cdot \in ox \cdot L \cdot W / tox \quad (4)$$

The area of the capacitance detection electrode 270 is referred to as S (μm$^2$), the thickness of the capacitance detection dielectric film 272 is referred to as td (μm), and the relative dielectric constant of the capacitance detection dielectric film 272 is referred to as $\in$d. The capacitance of the capacitor $C_D$ is expressed by the following equation (5).

$$C_D = \in o \cdot \in d \cdot S / td \quad (5)$$

In the equivalent circuit shown in FIG. 7, a voltage $V_{GT}$ applied to the gate of the signal amplification TFT 206 is expressed as follows.

$$V_{GT} = Vdd/(1 + C_D/C_T) \quad (6)$$

If the capacitance of the capacitor $C_D$ is set sufficiently greater than the capacitance of the transistor capacitor $C_T$ ($C_D > 10 \times C_T$, for example), the denominator in the equation (6) becomes infinite, whereby $V_{GT}$ is approximated as follows.

$$V_{GT} \approx 0 \quad (7)$$

As a result, the signal amplification TFT 206 is in an off state since almost no voltage is applied to the gate of the signal amplification TFT 206. Therefore, current I which flows between the source and the drain of the signal amplification TFT 206 is extremely decreased. The measurement point can be judged to be the ridge (projecting section) of the fingerprint pattern by measuring the current I.

(2) When Valley (Concave Section) of Fingerprint Pattern Faces Capacitance Detection Dielectric Film 272

Figure 8:
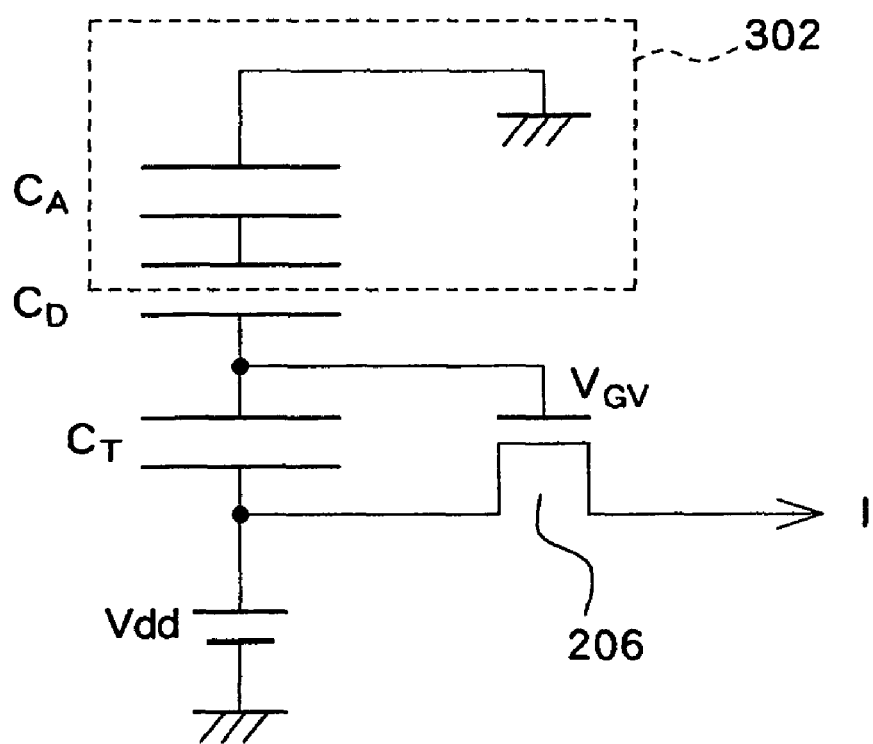
FIG. 8 is an equivalent circuit diagram of a capacitance detection element in the case where a valley of a finger is in contact with a capacitance detection dielectric film.

FIG. 8 shows an equivalent circuit of the capacitance detection element 204 in this case. A symbol 302 corresponds to a valley of a human fingerprint. In this case, a capacitor $C_A$ in which air is a dielectric is formed between the dielectric film 272 and the valley of the fingerprint in addition to the capacitor $C_D$ shown in FIG. 7.

In the equivalent circuit shown in FIG. 8, a voltage $V_{GV}$ applied to the gate of the signal amplification TFT 206 is expressed as follows.

$$V_{GV} = Vdd / \{[1 + (1/C_T)] \times 1/[(1/C_D) + (1/C_A)]\} \quad (8)$$

If the capacitance of the capacitor $C_D$ is set sufficiently greater than the capacitance of the transistor capacitor $C_T$ ($C_D > 10 \times C_T$, for example), the equation (8) is approximated as follows.

$$V_{GV} \approx Vdd / [1 + (C_A/C_T)] \quad (9)$$

If the capacitance of the transistor capacitor $C_T$ is set sufficiently greater than the capacitance of the capacitor $C_A$ formed by the valley of the fingerprint ($C_T > 10 \times C_A$, for example), the equation (9) is approximated as follows.

$$V_{GV} \approx Vdd \quad (10)$$

As a result, the signal amplification TFT 206 is in an on state since the power supply voltage Vdd is applied to the gate of the signal amplification TFT 206. Therefore, the current I which flows between the source and the drain of the signal amplification TFT 206 is extremely increased. Therefore, the measurement point can be judged to be the valley (recess section) of the fingerprint pattern by measuring the current I.

The variable capacitor $C_F$ shown in FIG. 5 has a capacitance equal to the capacitance of the capacitor $C_D$ when the ridge of the fingerprint is in contact with the capacitance detection dielectric film 272, and has a capacitance equal to the sum of the capacitance of the capacitor $C_D$ and the capacitance of the capacitor $C_A$ when the valley of the fingerprint faces the capacitance detection dielectric film 272. Therefore, the capacitance of the variable capacitor $C_F$ varies corresponding to the ridge and valley of the fingerprint. The ridge or valley of the fingerprint can be detected by detecting the current based on the change in capacitance corresponding to the ridge and valley of the fingerprint.

Figure 9A:
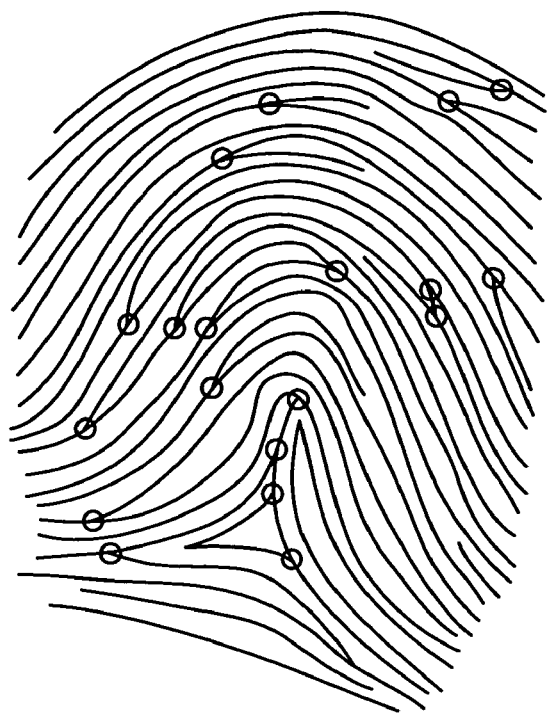
FIGS. 9A and 9B are illustrative of examples of feature points of a fingerprint.
Figure 9B:
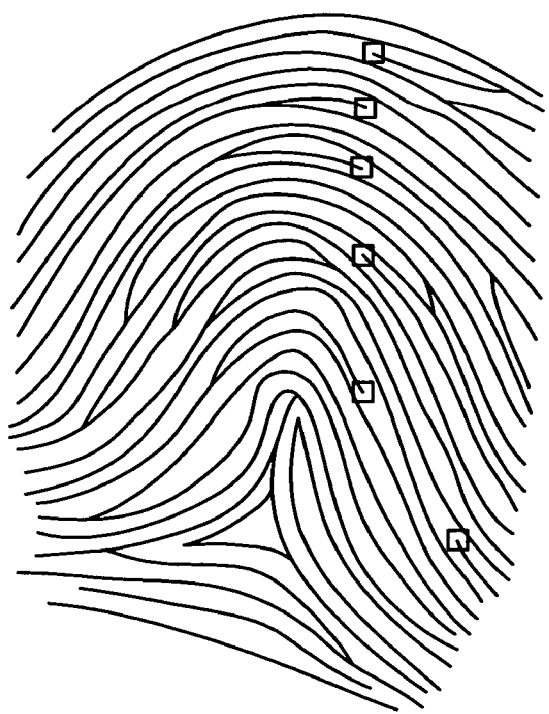

A fingerprint pattern can be detected by carrying out the above-described operation in each of the M×N capacitance detection elements 204 by time division. In more detail, the ridge or valley of the fingerprint is sequentially detected in the capacitance detection elements located in each column in the first row, and the ridge or valley of the fingerprint is then detected in the second row. The ridge or valley of the fingerprint is detected in pixel units in this manner. This enables a fingerprint image as shown in FIGS. 9A and 9B to be obtained, for example. In this embodiment, fingerprint images are periodically captured by using the fingerprint sensor 132.

In the case where a positive power supply is used as the power supply voltage Vdd, the signal amplification TFT 206 is formed by using an enhancement N-type transistor in which a drain current does not flow at a gate voltage of about zero. Provided that the gate voltage at which the drain current is minimum (minimum gate voltage) in the transfer characteristics of the signal amplification TFT 206 is Vmin, $C_D > 10 \times C_T$ is satisfied by satisfying $0 < \text{Vmin} < 0.1 \times \text{Vdd}$.

In the case where a negative power supply is used as the power supply voltage Vdd, the signal amplification TFT 206 is formed by using an enhancement P-type transistor in which a drain current does not flow at a gate voltage of about zero. Provided that the gate voltage at which the drain current is minimum (minimum gate voltage) in the transfer characteristics of the signal amplification TFT 206 is Vmin, $C_D > 10 \times C_T$ is satisfied by satisfying $0.1 \times \text{Vdd} < \text{Vmin} < 0$.

In this embodiment, the control information is output by using the captured fingerprint image in this manner. In this case, the processing load is reduced by using feature points of the captured fingerprint image.

FIGS. 9A and 9B show examples of feature points of the fingerprint. FIG. 9A shows an example of bifurcations of the fingerprint. FIG. 9B shows an example of ending points of the fingerprint. The bifurcations of the fingerprint are extracted from the fingerprint image captured by the fingerprint sensor 132, for example. In FIGS. 9A and 9B, the fingerprint image shows the form of ridges (projecting sections) of the fingerprint. The bifurcation of the fingerprint is a portion at which the ridge of the fingerprint branches off into two or more ridges. The ending point of the fingerprint is a portion at which the ridge of the fingerprint ends.

Since the forms of the fingerprints are not identical, the distribution of the bifurcations or the ending points of the fingerprint differs between individuals. Therefore, if the bifurcations or the ending points of the fingerprint image can be determined, it suffices to merely compare the distribution of the bifurcations or the ending points. This reduces the amount of information to be compared, whereby the load of comparison processing can be reduced.

1.2 Operation Flow

Figure 10:
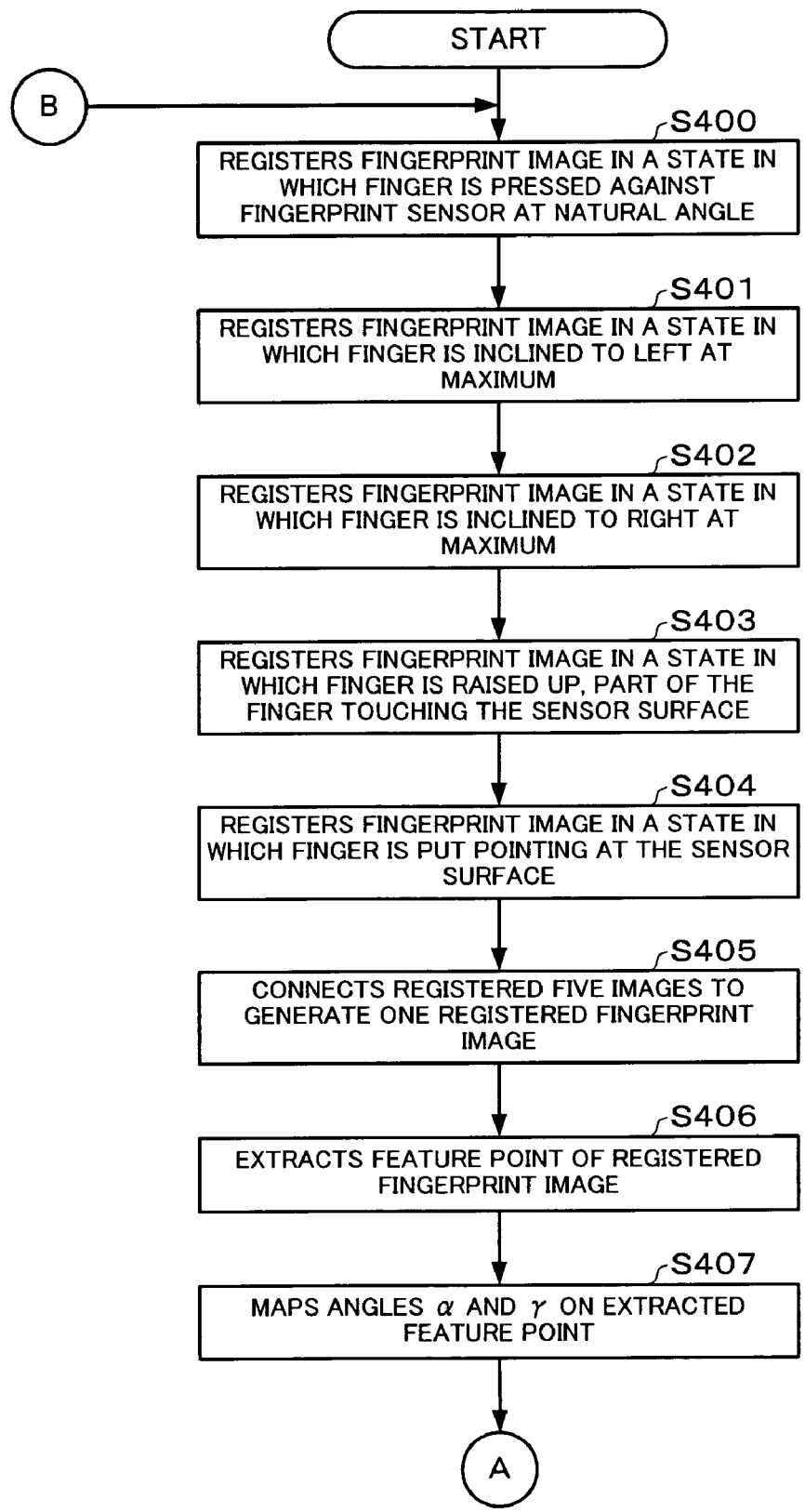
FIG. 10 is a flowchart showing the first half of an example of a processing flow of an input device.
Figure 11:
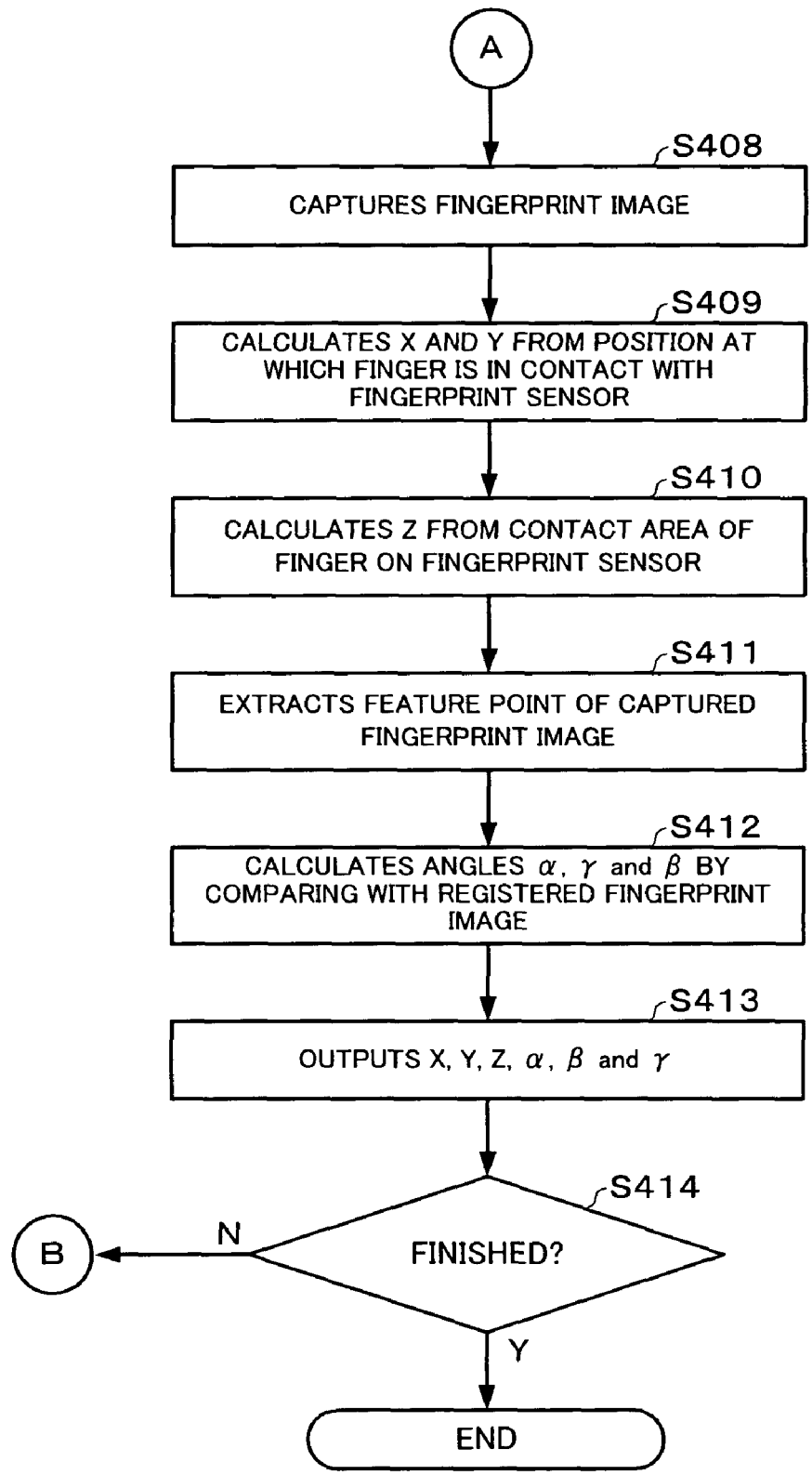
FIG. 11 is a flowchart showing the second half of an example of a processing flow of an input device.

FIGS. 10 and 11 show an example of a processing flow of the input device in this embodiment. A program for executing the processing shown in FIG. 10 is stored in the ROM 126 or RAM 128. The CPU 124 performs processing according to the program.

In the input device, a fingerprint of the user to be captured is registered in a registration mode. In this case, one sheet of an image of a fingerprint of a finger in a three-dimensional shape is registered as the registration fingerprint image. Therefore, one registration fingerprint image is generated by capturing images of each region of the finger. A fingerprint image is captured in a state in which the finger is pressed against the sensor surface (detection surface) of the fingerprint sensor 132 at a natural angle (angle formed by the finger and the sensor surface is 15 degrees, for example) as the original position of the finger. The CPU 124 allows the fingerprint sensor 132 to capture the fingerprint image through the fingerprint sensor I/F circuit 130, and stores the fingerprint image while associating the fingerprint image with the original position (step S400).

The fingerprint image is captured by the fingerprint sensor 132 in a state in which the finger is inclined to the left at the maximum (rotation angle γ of about −45 degrees). The CPU 124 allows the fingerprint sensor 132 to capture the fingerprint image through the fingerprint sensor I/F circuit 130, and stores the fingerprint image while associating the fingerprint image with the rotation angle γ (step S401).

The fingerprint image is captured by the fingerprint sensor 132 in a state in which the finger is inclined to the right at the maximum (rotation angle γ of about 45 degrees). The CPU 124 allows the fingerprint sensor 132 to capture the fingerprint image through the fingerprint sensor I/F circuit 130, and stores the fingerprint image while associating the fingerprint image with the rotation angle γ (step S402).

The fingerprint image is captured by the fingerprint sensor 132 in a state in which the finger is raised up, part of the finger touching the sensor surface (angle formed by the sensor surface and the finger (rotation angle α) is 0 degree (horizontal)). The CPU 124 allows the fingerprint sensor 132 to capture the fingerprint image through the fingerprint sensor I/F circuit 130, and stores the fingerprint image while associating the fingerprint image with the rotation angle α (step S403).

The fingerprint image is captured by the fingerprint sensor 132 in a state in which the finger is put pointing at the sensor surface (rotation angle α of about 60 degrees). The CPU 124 allows the fingerprint sensor 132 to capture the fingerprint image through the fingerprint sensor I/F circuit 130, and stores the fingerprint image while associating the fingerprint image with the rotation angled α (step S404).

The CPU 124 connects the five images to generate one registration fingerprint image (step S405). In order to perform processing for connecting each image with high accuracy at high speed, it is preferable to register the fingerprint image when capturing the fingerprint image at the original position in a state in which the finger is strongly pressed against the sensor surface of the fingerprint sensor 132. This enables the range of the fingerprint pattern captured as the fingerprint image at the original position to be increased, whereby the fingerprint pattern can be efficiently connected with the fingerprint patterns of other fingerprint images. Moreover, an image (reference) in which Z is minimum can be obtained.

FIGS. 12A, 12B, 12C, 13A, and 13B show examples of images of each region of the finger for generating the registration fingerprint image. FIG. 12A shows an example of the fingerprint image 502 of the finger at the original position captured in a detection area 500 of the sensor surface of the fingerprint sensor 132 in the step S400 shown in FIG. 10. FIG. 12B shows an example of the fingerprint image 504 near the left side of the finger captured in the detection area 500 in the step S401 shown in FIG. 10. FIG. 12C shows an example of the fingerprint image 506 near the right side of the finger captured in the detection area 500 in the step S401 shown in FIG. 10. FIG. 13A shows an example of the fingerprint image 508 on the joint side of the finger captured in the detection area 500 in the step S403 shown in FIG. 10. FIG. 13B shows an example of the fingerprint image 510 on the tip side of the finger captured in the detection area 500 in the step S404 shown in FIG. 10.

With respect to the fingerprint image 502 in FIG. 12A, the fingerprint image 504 shown in FIG. 12B corresponds to a fingerprint image in the case where the fingerprint image is rotated in the (−) direction around the Y axis on the detection surface of the fingerprint sensor. The fingerprint image 506 shown in FIG. 12C corresponds to a fingerprint image in the case where the fingerprint image is rotated in the (+) direction around the Y axis on the detection surface of the fingerprint sensor. The fingerprint image 508 shown in FIG. 13A corresponds to a fingerprint image in the case where the fingerprint image is rotated in the (−) direction around the X axis on the detection surface of the fingerprint sensor. The fingerprint image 510 shown in FIG. 13B corresponds to a fingerprint image in the case where the fingerprint image is rotated in the (+) direction around the X axis on the detection surface of the fingerprint sensor.

Figure 14:
FIG. 14 is illustrative of an example of a registration fingerprint image.

FIG. 14 shows an example of a registration fingerprint image. In FIG. 14, a registration fingerprint image 520 is generated by connecting the fingerprint images 504, 506, 508, and 510 of each region of the fingerprint shown in FIGS. 12A, 12B, 12C, 13A, and 13B in the step S405 shown in FIG. 10.

The description is given with reference to FIG. 10. If the registration fingerprint image is generated in this manner, the input device associates the rotation angles α and γ with each section of the registration fingerprint image. The correction values of the functions f(γ) and g(α) shown in the equation (3) may be associated with each section of the registration fingerprint image. In the input device in this embodiment, if the registration fingerprint image is generated in the step S405, the CPU 124 extracts feature points of the registration fingerprint image (step S406). The feature point (minutiae point) used herein refers to the ending point or the bifurcation of the ridge of the fingerprint as shown in FIGS. 9A and 9B.

The CPU 124 maps the rotation angles α and γ (values of parameters in a broad sense) on the feature points of the registration fingerprint image extracted in the step S406 (step S407).

Figure 15A:
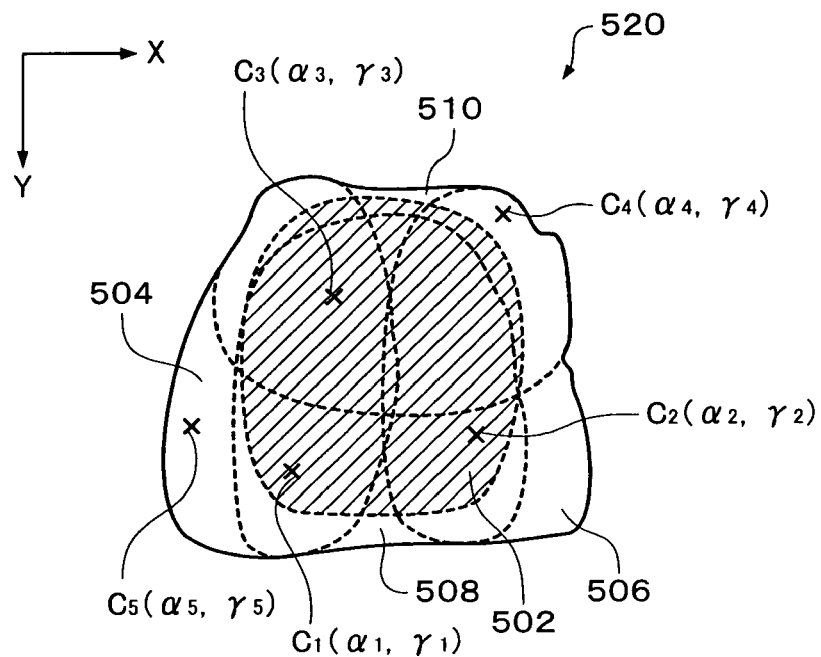
FIGS. 15A and 15B illustrative of a method of mapping a rotation angle on a registration fingerprint image.
Figure 15B:
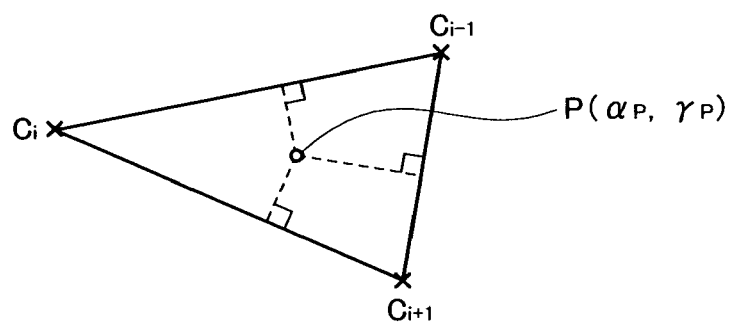

FIGS. 15A and 15B are illustrative of the mapping processing for the registration fingerprint image. In FIG. 15A, feature points $C_1$ to $C_5$ of a registration fingerprint image 520 are extracted. In this case, a pair of the rotation angles α and γ is mapped on the feature point $C_i (1 \leq i \leq 5$, i is an integer) as $(\alpha_i, \gamma_i)$. "$-\alpha_m$" and "$+\alpha_n$" are respectively associated with the fingerprint image 508 and the fingerprint image 510 at the time of registration. Therefore, if "$-\alpha_m$" and "$+\alpha_n$" are determined to be the reference mapping positions of the registration fingerprint image 520, the rotation angle $\alpha_i$ of each feature point $C_i$ can be mapped corresponding to the position of the feature point with respect to the reference mapping position. For example, in the case where "$-\alpha_m$" and "$+\alpha_n$" are respectively mapped on the feature point $C_1$ and the feature point $C_4$, the rotation angle $\alpha_3$ can be determined corresponding to the Y coordinate of the feature point $C_3$ which internally divides the length between the feature point $C_1$ and the feature point $C_4$ in the registration fingerprint image in the Y axis direction. The rotation angle γ can be determined corresponding to the X coordinate in the same manner as described above.

As shown in FIG. 15B, $(\alpha_p, \gamma_p)$ may be mapped on an arbitrary point P of the registration fingerprint image 520 in addition to the feature points. In this case, the rotation angles $\alpha_p$ and $\gamma_p$ mapped on the point P may be calculated by internally dividing the rotation angles α and γ mapped on three feature points $C_{i-1}$, $C_i$, and $C_{i+1}$ near the point P, for example.

The description is given with reference to FIG. 11. If the rotation angles α and γ are mapped on the registration fingerprint image in the step S407, the CPU 124 instructs the fingerprint sensor 132 to capture a new fingerprint image (step S408).

The position X in the X axis direction and the position Y in the Y axis direction are calculated from the position at which the finger is in contact with the detection area 500 of the sensor surface of the fingerprint sensor 132 (step S409).

Figure 16:
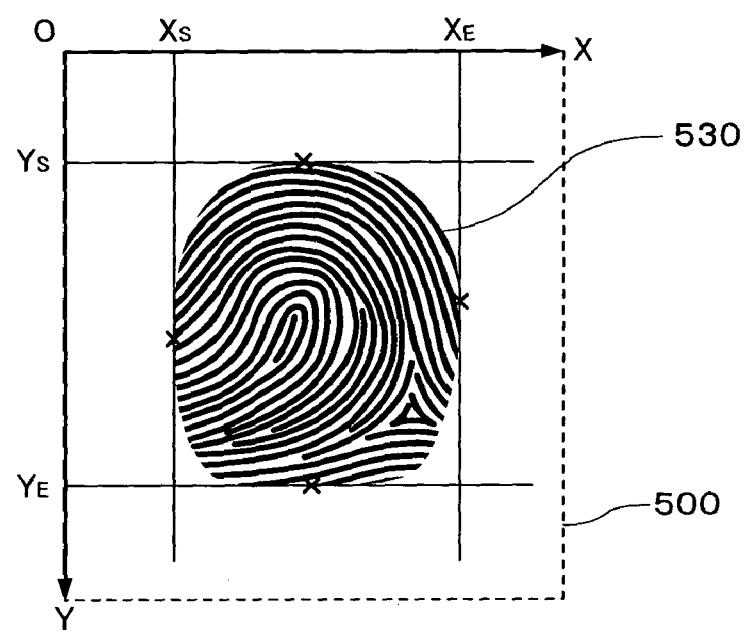
FIG. 16 is illustrative of a method of calculating the position on a fingerprint sensor.

FIG. 16 is a view illustrating a processing method for calculating the position X in the X axis direction and the position Y in the Y axis direction. The following description is given on the assumption that the fingerprint sensor 132 scans the fingerprint in the detection area 500 in the X axis direction and the Y axis direction, and a fingerprint image 530 is captured at a position shown in FIG. 16. The maximum value and the minimum value of the outline of the fingerprint image 530 in the X axis direction are referred to as $X_E$ and $X_S$, and the maximum value and the minimum value of the outline of the fingerprint image 530 in the Y axis direction are referred to as $Y_E$ and $Y_S$. The position (X, Y) calculated in the step S409 shown in FIG. 11 may be $(X_S, Y_S)$, $(X_E, Y_E)$, or $((X_S+X_E)/2, (Y_S+Y_E)/2)$, for example. The position of the captured fingerprint image in the X axis direction and the Y axis direction can be specified by using any of these methods.

If the positions in the X axis direction and the Y axis direction are calculated in the step S409 shown in FIG. 11, the position in the Z axis direction perpendicular to the sensor surface is calculated from the contact area of the captured fingerprint image (step S410).

Figure 17:
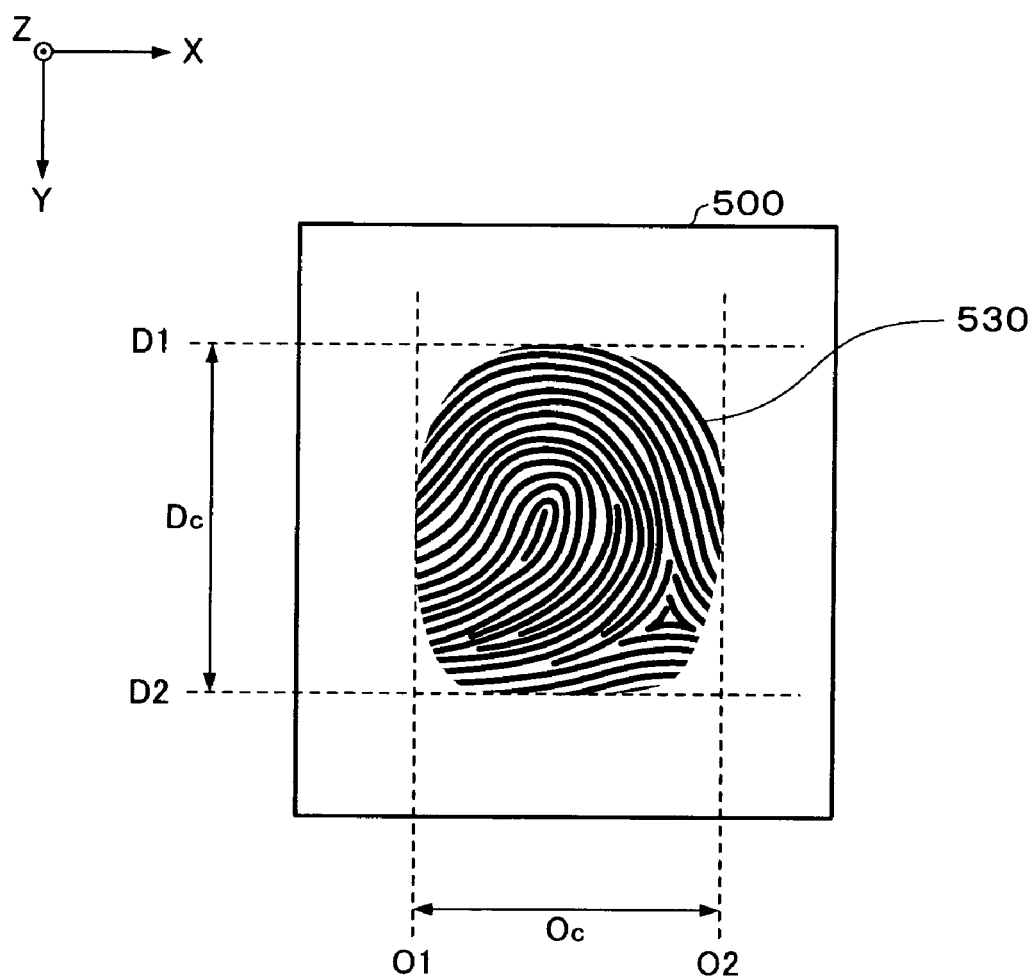
FIG. 17 is illustrative of a method of calculating a contact area of a finger on a fingerprint sensor.

FIG. 17 is illustrative of a method of calculating the area of the fingerprint image. When the fingerprint image 530 is captured in the detection area 500, the fingerprint sensor 132 specifies the number Oc of output lines through which the ridge or valley of the fingerprint is detected in the X axis direction by an output line O1 at which detection of the ridge or valley of the fingerprint is started and an output line O2 at which the ridge or valley of the fingerprint is detected last. The number Dc of power supply lines through which the ridge or valley of the fingerprint is detected can be specified in the Y axis direction by a power supply line D1 at which detection of the ridge or valley of the fingerprint is started and a power supply line D2 at which the ridge or valley of the fingerprint is detected last. Therefore, a value equivalent to the area of the fingerprint image 530 can be calculated by the number Oc of output lines and the number Dc of power supply lines. Since the rectangle circumscribed on the outline of the captured fingerprint image can be easily calculated by specifying the power supply lines and the output lines of the fingerprint sensor 132, the processing load for calculating the area of the fingerprint image can be reduced.

The CPU may calculate the rectangle circumscribed on the captured image and calculate the area of the image.

If the area of the fingerprint image 530 (or a value equivalent to the area) is calculated, the position Z in the Z axis direction is calculated based on the area of the fingerprint image 502 (FIG. 12A) at the original position registered in the step S400. For example, provided that the area of the fingerprint image 530 at the original position is $S_0$ and the area of the fingerprint image shown in FIG. 17 is $S_1$, the position Z in the Z axis direction may be calculated by the following equation (11).

$$Z = e \cdot (S_1 - S_0) \text{(where } 0 \leq e \leq 1\text{)} \tag{11}$$

The coefficient e (given fifth coefficient) is a coefficient for calculating the position in the Z axis direction. It is preferable that the coefficient e be determined by adding the user's peculiar operation in the Z axis direction, for example.

The fingerprint image at the original position and the fingerprint image in which the finger is strongly pressed so that the position in the Z axis direction is minimum may be registered in advance, and the position in the Z axis direction corresponding to the area of the fingerprint image 530 shown in FIG. 17 may be calculated based on the areas of each fingerprint image. In this case, the position Z in the Z axis direction can be calculated with higher accuracy.

If the position Z in the Z axis direction is calculated in the step S410, feature points of the fingerprint image captured in the step S408 are extracted (step S411).

The feature points of the fingerprint image extracted in the step S411 are compared with the feature points of the registration fingerprint image. In more detail, collation processing in which a search is made to determine whether the fingerprint image captured in the step S408 corresponds to a certain area of the registration fingerprint image by searching a position at which the similarity of the positional relation between the feature points of both images is maximized. As a result, the rotation angles α and γ mapped on the searched corresponding area of the registration fingerprint image (or control information corresponding to the rotation angles α and γ) are output (step S412). In the case where the degree of similarity is increased by rotating the fingerprint image, the rotation angle β around the Z axis is calculated.

Figure 18A:
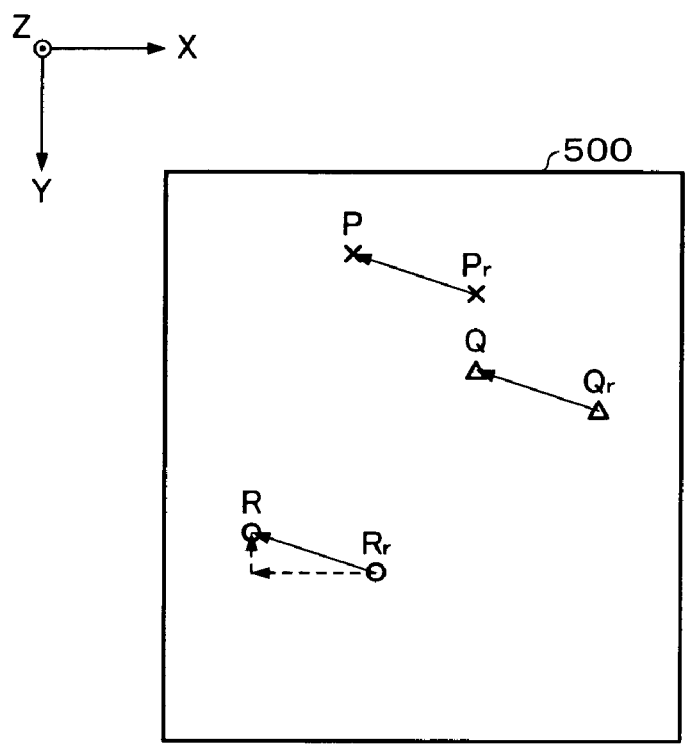
FIGS. 18A and 18B are illustrative of collation processing of feature points.
Figure 18B:
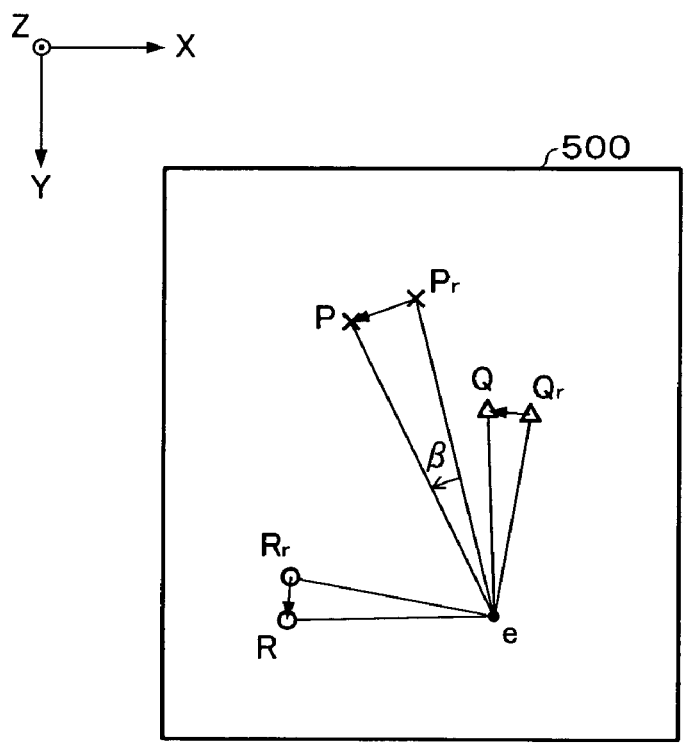

FIGS. 18A and 18B schematically show examples of the collation processing of the feature points. FIGS. 18A and 18B show the case where feature points $P_r$, $Q_r$, and $R_r$ extracted from the registration fingerprint image are moved to positions of feature points P, Q, and R of the fingerprint image captured in the step S408. As shown in FIG. 18A, the CPU 124 moves the fingerprint image in the X axis direction and the Y axis direction so that at least the feature points $P_r$, $Q_r$, and $R_r$ among three or more extracted feature points respectively coincide with the corresponding feature points P, Q, and R to calculate the corresponding area of the registration fingerprint image.

As shown in FIG. 18B, the CPU 124 calculates a reference point e and the rotation angle β around the Z axis with respect to the reference point e as the center so that at least the feature points $P_r$, $Q_r$, and $R_r$ among three or more extracted feature points respectively coincide with the corresponding feature points P, Q, and R.

If the rotation angles α, γ, and β are calculated, the CPU 124 outputs the control information corresponding to the position X in the X axis direction, the position Y in the Y axis direction, the position Z in the Z axis direction, and the rotation angles α, γ, and β (step S413). For example, the position X is corrected as shown by the equation (1), and the corrected position X is output. The position Y is corrected as shown by the equation (2), and the corrected position Y is output. The position Z is corrected as shown by the equation (3), and the corrected position Z is output. The CPU 124 may output the position X in the X axis direction, the position Y in the Y axis direction, the position Z in the Z axis direction, and the rotation angles α, γ, and β as is as the control information.

If the processing is finished (step S414: Y), processing is terminated (END). If the processing is not finished (step S414: N), the operation is returned to the step S400.

As described above, the values of the parameters for performing the control instruction at least in one axis (two axes in this embodiment) direction among the six-axis directions are associated with the corresponding area of the registration fingerprint image corresponding to each region of the fingerprint, and the control information corresponding to the parameter value associated with the area of the registration fingerprint image corresponding to the captured fingerprint image is output. This enables not only the control information in the X axis direction and the Y axis direction on the sensor surface of the fingerprint sensor 132 and in the Z axis direction, but also the control information corresponding to the rotation angles around the X axis, the Y axis, and the Z axis to be output. Therefore, an input device which is extremely lightweight and small and is capable of further improving operability can be provided.

MODIFICATION EXAMPLE

The above-described embodiment illustrates the case where the position ($X_{sensor}$, $Y_{sensor}$) on the detection surface is calculated by using the outline of the fingerprint image. However, the present invention is not limited thereto. For example, the position ($X_P$, $Y_P$) corresponding to the deviation of the position of the feature point from the reference position may be calculated by using the feature point of the fingerprint image.

In this case, the position of the detection object on the detection surface may be expressed by the following equations instead of the equations (1) and (2).

$$X = X_P - a \cdot \gamma \tag{12}$$

$$Y = Y_P - b \cdot \alpha \tag{13}$$

In this case, the control information can be generated in the same manner as in the above embodiment. In particular, an input device which is highly sensitive, extremely small, and extremely lightweight, consumes only a small amount of electric power, and enables the control instruction in the six-axis directions can be provided by using the capacitance type fingerprint sensor.

2. Information Device

Figure 19:
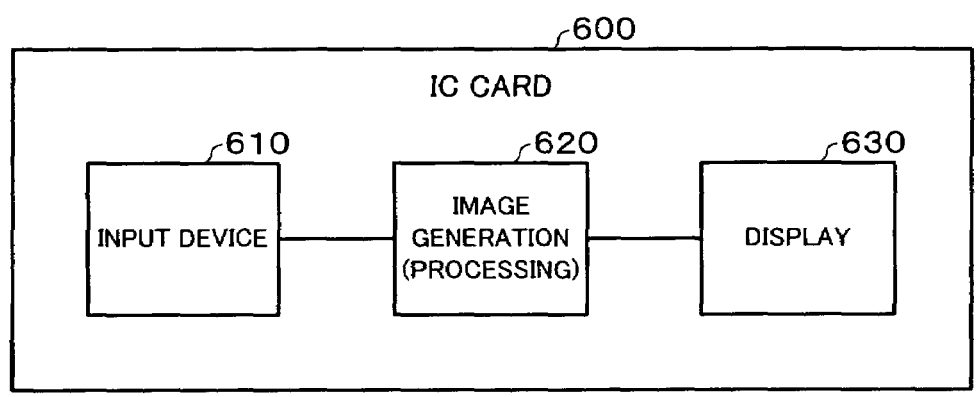
FIG. 19 is a block diagram showing a configurational example of an IC card.

FIG. 19 shows an example of a configurational block diagram of an IC card to which the input device in this embodiment is applied. An IC card 600 includes an input device 610 using the above-described fingerprint sensor, an image generation section (processing section which performs control processing of a predetermined object of control in a broad sense) 620, and a display section 630. The input device 610 is the input device described with reference to FIG. 1 or 4. The image generation section 620 is realized by a CPU and a software program stored in a ROM or RAM. The display section 630 is realized by an LCD panel and a driver circuit of the LCD panel.

The image generation section 620 generates image data (performs control processing in a broad sense) based on the control information output from the input device 610. In more detail, the image generation section 620 generates image data of an image which is changed corresponding to the movement instruction in the six-axis directions by the input device 610. The display section 630 displays an image based on the image data generated by the image generation section 620.

In the IC card 600 having such a configuration, a pointer displayed in the display section 630 can be moved or an image displayed in the display section 630 can be scrolled by allowing the user to instruct the movement by moving the fingerprint image of the finger in the six-axis directions in the input device 600.

The above description illustrates the case where the IC card is used as the an information device. However, the input device according to this embodiment may be applied to a PDA, a portable telephone, a three-dimensional CAD device, a virtual reality experience device, an electronic musical instrument, or the like.

The present invention is not limited to the above-described embodiment. Various modifications and variations are possible within the spirit and scope of the present invention.

The above embodiment illustrates the input device using the fingerprint sensor. However, the present invention is not limited thereto. The control information may be output in the same manner as described above by capturing an image of a two-dimensional or three-dimensional object other than a fingerprint. The present invention may also be applied to an input device which does not include a detection surface.

Part of requirements of any claim of the present invention could be omitted from a dependent claim which depends on that claim. Moreover, part of requirements of any independent claim of the present invention could be made to depend on any other independent claim.

The following items are disclosed relating to the above-described embodiment.

One embodiment of the present invention relates to an input device which generates control information by capturing an image of a detection object, comprising:

a registered image storage section which stores a registered image in which a parameter value is associated with at least a part of the registered image;

an image capture section which captures an image of the detection object; and a control information output section which outputs control information corresponding to the parameter value associated with an area of the registered image corresponding to the image of the detection object.

The registered image is stored in this input device. The parameter value is associated with at least a part of the registered image. The area of the registered image corresponding to the image of the detection object is searched by comparing the captured image of the detection object with the registered image, and the control information corresponding to the parameter value associated with the corresponding area is output. This enables the control information relating to the direction which cannot be controlled only by the movement of the captured image to be output, whereby an input device which has a simplified configuration and is capable of further improving operability can be provided.

This input device may comprise an image registration section which connects images of respective regions of the detection object and registers a registered image in which the parameter value corresponding to each of the regions of the detection object is associated with each of the images.

In this input device, the image of the surface of the detection object having a three-dimensional shape is registered as the registered image, for example. Therefore, the control information corresponding to the rotational direction of the detection object can be output by associating the parameter value with each region of the detection object having a three-dimensional shape such as the side surface. This enables an input device which is capable of further improving operability to be provided without requiring the device to have a complicated configuration.

In this input device, the parameter value may be associated with a feature point extracted from the registered image.

According to this input device, since the registered image can be registered with a reduced amount of data, the processing load of the input device which compares the registered image with the captured image can be reduced.

In this input device, the image capture section may include a detection surface and may capture an image of the detection object when the detection object is in contact with the detection surface, and the control information output section may output the control information corresponding to movement of the detection object in an axis direction perpendicular to the detection surface based on area of the registered image and area of the image of the detection object captured by the image capture section.

In this input device, the control information corresponding to the movement of the detection object not only in the two-axis directions on the detection surface for capturing the image, but also in the axis direction perpendicular to the detection surface is output. Therefore, the control instruction in a new axis direction which is not limited to the movement of the position of the captured image can be performed. This enables operability to be further improved.

In this input device, the control information corresponding to the movement of the detection object in the axis direction perpendicular to the detection surface may be information corrected by using a rotation angle around at least one of a first axis and a second axis which intersect each other at right angles on the detection surface.

In this input device, the control information corresponding to the movement of the detection object in the axis direction perpendicular to the detection surface is obtained by calculating the movement in this axis direction. The movement is corrected by using the rotation angle around at least one of the first axis and the second axis which intersect at right angles on the detection surface. This enables the movement in the vertical axis direction to be detected taking the case where the detection object is rotated while being slid on the detection surface, whereby the control information in this axis direction can be output with higher accuracy.

In this input device, the parameter value may include rotation angles around a first axis and a second axis which intersect each other at right angles on the detection surface, and the control information output section may output control information corresponding to the rotation angle of the detection object around the first axis or the second axis based on a comparison result of the registered image and the image of the detection object.

According to this input device, since the control information corresponding to the rotation angle around the first axis or the second axis on the detection surface can be output, the number of axis directions which allow the control instruction can be increased, whereby an input device which is capable of further improving operability can be provided.

In this input device, the control information output section may output control information corresponding to a rotation angle of the detection object around a third axis perpendicular to the detection surface based on the comparison result of the registered image and the image of the detection object.

According to this input device, since the control information corresponding to the rotation angle of the detection object around the third axis perpendicular to the detection surface is output, the number of axis directions which allow the control instruction can be increased, whereby an input device which is capable of further improving operability can be provided.

In this input device, the detection object may be a fingerprint.

According to this input device, a larger number of control directions can be given by using a fingerprint. Therefore, an input device which is extremely small and lightweight and is capable of further improving operability can be provided by using a fingerprint sensor which captures a fingerprint image.

Another embodiment of the present invention relates to an information device comprising the above input device, and a processing section which performs control processing based on the control information from the input device.

According to this information device, a portable information device which is extremely small and lightweight and is capable of further improving operability can be provided.

A further embodiment of the present invention relates to a control information generation method for generating control information by using a captured image of a detection object, the control information generation method comprising:

comparing a captured image of the detection object with a registered image in which a parameter value is associated with at least a part of the registered image; and outputting control information corresponding to the parameter value associated with an area of the registered image corresponding to the image of the detection object.

This control information generation method may comprise outputting the control information corresponding to movement of the detection object in an axis direction perpendicular to a detection surface for the image of the detection object based on area of the registered image and area of the captured image of the detection object.

In this control information generation method, the parameter value may include rotation angles around a first axis and a second axis which intersect each other at right angles on a detection surface, and the method may comprise outputting the control information corresponding to the rotation angle of the detection object around the first axis or the second axis on a detection surface for the image of the detection object based on a comparative result of the registered image and the image of the detection object.

This control information generation method may comprise outputting the control information corresponding to a rotation angle of the detection object around a third axis perpendicular to a detection surface for the image of the detection object based on the comparison result of the registered image and the image of the detection object.

In this control information generation method, the detection object may be a fingerprint.

What is claimed is:

1. An input device which generates control information by capturing an image of a detection object, comprising:

a registered image storage section which stores a registered image in which a parameter value is associated with at least a part of the registered image;

an image capture section which captures an image of the detection object; and a control information output section which outputs control information corresponding to the parameter value associated with an area of the registered image corresponding to the image of the detection objects, wherein the image capture section includes a detection surface and captures an image of the detection object when the detection object is in contact with the detection surface, wherein the control information output section outputs the control information corresponding to movement of the detection object in an axis direction perpendicular to the detection surface based on area of the registered image and area of the image of the detection object captured by the image capture section, and wherein the control information is information corrected by using a rotation angle around at least one of a first axis and a second axis which intersect each other at right angles on the detection surface, the control information being corresponding to the movement of the detection object in the axis direction perpendicular to the detection surface.

2. The input device as defined in claim 1, comprising:

an image registration section which connects images of respective regions of the detection object and registers a registered image in which the parameter value corresponding to each of the regions of the detection object is associated with each of the images.

3. The input device as defined in claim 1, wherein the parameter value is associated with a feature point extracted from the registered image.

4. An input device which generates control information by capturing an image of a detection object, comprising:

a registered image storage section which stores a registered image in which a parameter value is associated with at least a part of the registered image;

an image capture section which captures an image of the detection object;

an area calculation section which calculates an area of the image of the detection object captured by the image capture section; and a control information output section which outputs control information corresponding to the parameter value associated with an area of the registered image corresponding to the image of the detection object, wherein the image capture section includes a detection surface and captures an image of the detection object when the detection object is in contact with the detection surface, and wherein the control information output section outputs the control information corresponding to movement of the detection object in an axis direction perpendicular to the detection surface based on area of the registered image and the area of the image of the detection object captured by the image capture section.

5. An input device which generates control information by capturing an image of a detection object, comprising:

a registered image storage section which stores a registered image in which a parameter value is associated with at least a part of the registered image;

an image capture section which captures an image of the detection object; and a control information output section which outputs control information corresponding to the parameter value associated with an area of the registered image corresponding to the image of the detection object, wherein the image capture section includes a detection surface and captures an image of the detection object when the detection object is in contact with the detection surface, wherein the control information output section outputs the control information corresponding to movement of the detection object in an axis direction perpendicular to the detection surface based on area of the registered image and the area of the image of the detection object captured by the image capture section, wherein the parameter value includes rotation angles around a first axis and a second axis which intersect each other at right angles on the detection surface, and wherein the control information output section outputs control information corresponding to the rotation angle of the detection object around the first axis or the second axis based on a comparison result of the registered image and the image of the detection object.

6. The input device as defined in claim 5, wherein the control information output section outputs control information corresponding to a rotation angle of the detection object around a third axis perpendicular to the detection surface based on the comparison result of the registered image and the image of the detection object.

7. The input device as defined in claim 5, wherein the detection object is a fingerprint.

8. An information device comprising:

the input device as defined in claim 5; and a processing section which performs control processing based on the control information from the input device.

9. A control information generation method for generating control information by using a captured image of a detection object, the control information generation method comprising:

comparing a captured image of the detection object with a registered image in which a parameter value is associated with at least a part of the registered image; and outputting control information corresponding to the parameter value associated with an area of the registered image corresponding to the image of the detection objects, wherein the parameter value includes rotation angles around a first axis and a second axis which intersect each other at right angles on a detection surface, and wherein the method comprises outputting the control information corresponding to the rotation angle of the detection object around the first axis or the second axis on a detection surface for the image of the detection object based on a comparative result of the registered image and the image of the detection object.

10. The control information generation method as defined in claim 9, comprising:

outputting the control information corresponding to movement of the detection object in an axis direction perpendicular to a detection surface for the image of the detection object based on area of the registered image and area of the captured image of the detection object.

11. The control information generation method as defined in claim 10, wherein the parameter value includes rotation angles around a first axis and a second axis which intersect each other at right angles on a detection surface, and wherein the method comprises outputting the control information corresponding to the rotation angle of the detection object around the first axis or the second axis on a detection surface for the image of the detection object based on a comparative result of the registered image and the image of the detection object.

12. The control information generation method as defined in claim 9, comprising:

outputting the control information corresponding to a rotation angle of the detection object around a third axis perpendicular to a detection surface for the image of the detection object based on the comparison result of the registered image and the image of the detection object.

13. The control information generation method as defined in claim 9, wherein the detection object is a fingerprint.

* * * * *